US012697790B2

(12) United States Patent
Spalding et al.

(10) Patent No.: US 12,697,790 B2
(45) Date of Patent: Aug. 4, 2026

(54) PROCESSING OF COMPOSITES WITH PARTIAL PLIES

(71) Applicant: The Boeing Company, Arlington, VA (US)

(72) Inventors: John F. Spalding, Renton, WA (US); Marc R. Matsen, Seattle, WA (US); Gwendolyn Marie Janda, Seattle, WA (US)

(73) Assignee: The Boeing Company, Arlington, VA (US)

( * ) Notice: Subject to any disclaimer, the term of this patent is extended or adjusted under 35 U.S.C. 154(b) by 386 days.

(21) Appl. No.: 18/166,926

(22) Filed: Feb. 9, 2023

(65) Prior Publication Data

US 2024/0269942 A1     Aug. 15, 2024

(51) Int. Cl.
| | |
|---|---|
| *B29C 70/44* | (2006.01) |
| *B29C 70/30* | (2006.01) |
| *B29C 70/54* | (2006.01) |
| *B29L 31/30* | (2006.01) |

(52) U.S. Cl.
CPC .............. *B29C 70/44* (2013.01); *B29C 70/30* (2013.01); *B29C 70/545* (2013.01); *B29C 2793/0081* (2013.01); *B29L 2031/3076* (2013.01)

(58) Field of Classification Search
None
See application file for complete search history.

(56) References Cited

U.S. PATENT DOCUMENTS

| | | | | |
|---|---|---|---|---|
| 5,954,898 A * | 9/1999 | McKague | ............. | B29C 70/342 |
| | | | | 264/258 |
| 6,656,238 B1 * | 12/2003 | Rogers | .................. | C04B 35/528 |
| | | | | 44/628 |
| 8,851,879 B2 | 10/2014 | Waldrop et al. | | |
| 9,764,518 B2 * | 9/2017 | Kallinen | ............ | B29D 99/0014 |
| 2002/0146529 A1 * | 10/2002 | Lang | ..................... | B29C 70/548 |
| | | | | 428/36.9 |
| 2009/0081464 A1 * | 3/2009 | Summersgill | ........... | B29C 39/10 |
| | | | | 156/305 |
| 2009/0301641 A1 * | 12/2009 | Asahara | ................ | B29C 70/547 |
| | | | | 156/148 |
| 2010/0098906 A1 * | 4/2010 | Bongiovanni | .......... | B29C 70/50 |
| | | | | 156/286 |
| 2021/0129462 A1 * | 5/2021 | Rolland | ................ | B29C 70/443 |

FOREIGN PATENT DOCUMENTS

EP            3552813 A1     10/2019

OTHER PUBLICATIONS

Extended European Search Report, dated Jun. 21, 2024, regarding EP Application No. 24151929.7, 7 pages.
European Patent Office Action, dated Apr. 30, 2025, regarding EP Application No. 24151929.7, 5 pages.

* cited by examiner

*Primary Examiner* — Abbas Rashid
*Assistant Examiner* — Caroline Beha
(74) *Attorney, Agent, or Firm* — Yee & Associates, P.C.

(57) ABSTRACT

Methods of forming a composite structure from a preform with a vent are presented. A preform comprises a plurality of sets of full length plies, a plurality of sets of partial plies alternating with the plurality of sets of full length plies, and a vent extending through the plurality of sets of partial plies.

21 Claims, 16 Drawing Sheets

1100

1200

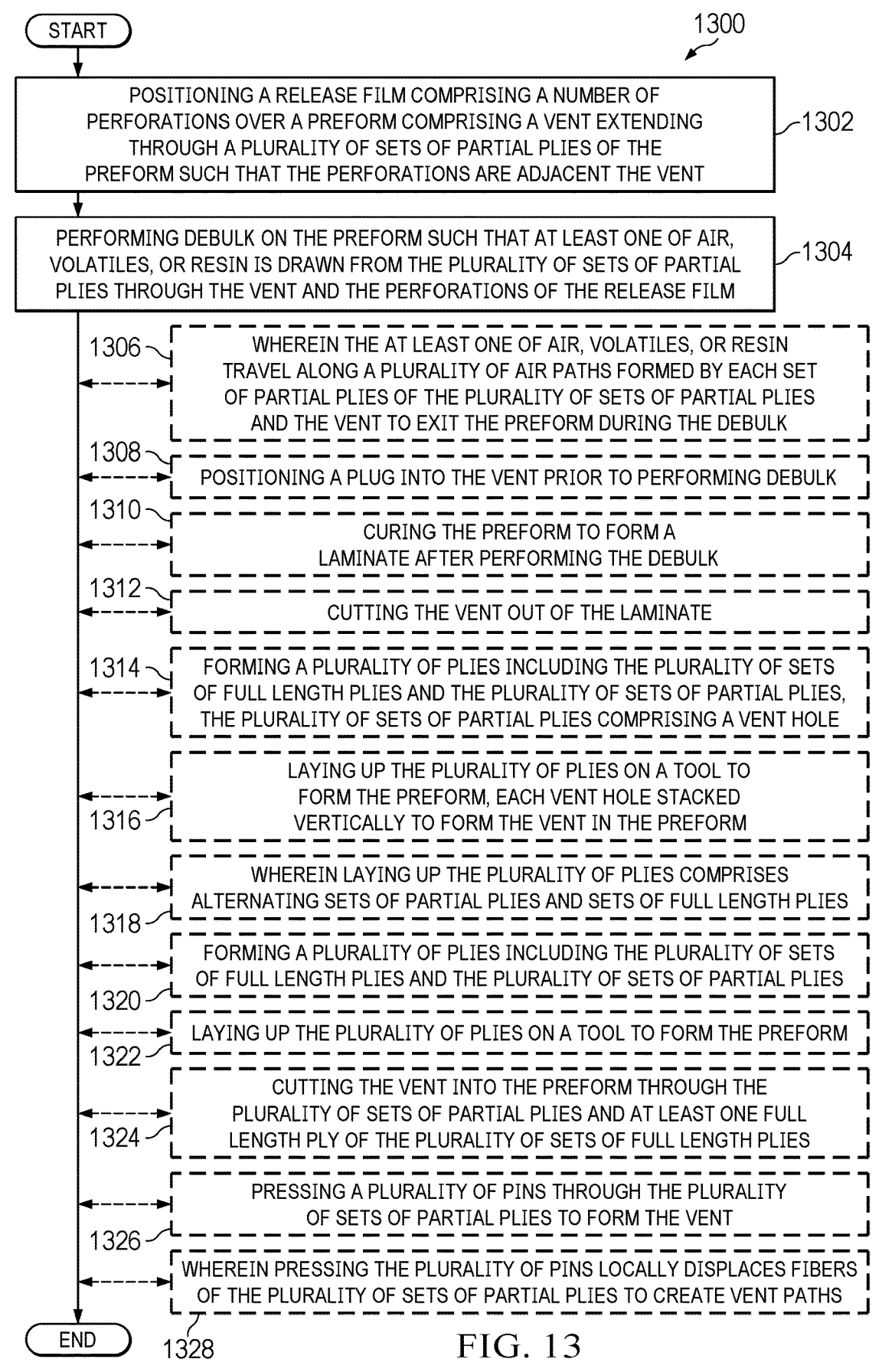

START

1300

POSITIONING A RELEASE FILM COMPRISING A NUMBER OF
PERFORATIONS OVER A PREFORM COMPRISING A VENT EXTENDING
THROUGH A PLURALITY OF SETS OF PARTIAL PLIES OF THE
PREFORM SUCH THAT THE PERFORATIONS ARE ADJACENT THE VENT
— 1302

PERFORMING DEBULK ON THE PREFORM SUCH THAT AT LEAST ONE OF AIR,
VOLATILES, OR RESIN IS DRAWN FROM THE PLURALITY OF SETS OF PARTIAL
PLIES THROUGH THE VENT AND THE PERFORATIONS OF THE RELEASE FILM
— 1304

1306 — WHEREIN THE AT LEAST ONE OF AIR, VOLATILES, OR RESIN
TRAVEL ALONG A PLURALITY OF AIR PATHS FORMED BY EACH SET
OF PARTIAL PLIES OF THE PLURALITY OF SETS OF PARTIAL PLIES
AND THE VENT TO EXIT THE PREFORM DURING THE DEBULK

1308 — POSITIONING A PLUG INTO THE VENT PRIOR TO PERFORMING DEBULK

1310 — CURING THE PREFORM TO FORM A
LAMINATE AFTER PERFORMING THE DEBULK

1312 — CUTTING THE VENT OUT OF THE LAMINATE

1314 — FORMING A PLURALITY OF PLIES INCLUDING THE PLURALITY OF SETS
OF FULL LENGTH PLIES AND THE PLURALITY OF SETS OF PARTIAL PLIES,
THE PLURALITY OF SETS OF PARTIAL PLIES COMPRISING A VENT HOLE

LAYING UP THE PLURALITY OF PLIES ON A TOOL TO
FORM THE PREFORM, EACH VENT HOLE STACKED
VERTICALLY TO FORM THE VENT IN THE PREFORM
1316

WHEREIN LAYING UP THE PLURALITY OF PLIES COMPRISES
ALTERNATING SETS OF PARTIAL PLIES AND SETS OF FULL LENGTH PLIES
1318

FORMING A PLURALITY OF PLIES INCLUDING THE PLURALITY OF SETS
OF FULL LENGTH PLIES AND THE PLURALITY OF SETS OF PARTIAL PLIES
1320

LAYING UP THE PLURALITY OF PLIES ON A TOOL TO FORM THE PREFORM
1322

CUTTING THE VENT INTO THE PREFORM THROUGH THE
PLURALITY OF SETS OF PARTIAL PLIES AND AT LEAST ONE FULL
LENGTH PLY OF THE PLURALITY OF SETS OF FULL LENGTH PLIES
1324

PRESSING A PLURALITY OF PINS THROUGH THE PLURALITY
OF SETS OF PARTIAL PLIES TO FORM THE VENT
1326

WHEREIN PRESSING THE PLURALITY OF PINS LOCALLY DISPLACES FIBERS
OF THE PLURALITY OF SETS OF PARTIAL PLIES TO CREATE VENT PATHS

END    1328    FIG. 13

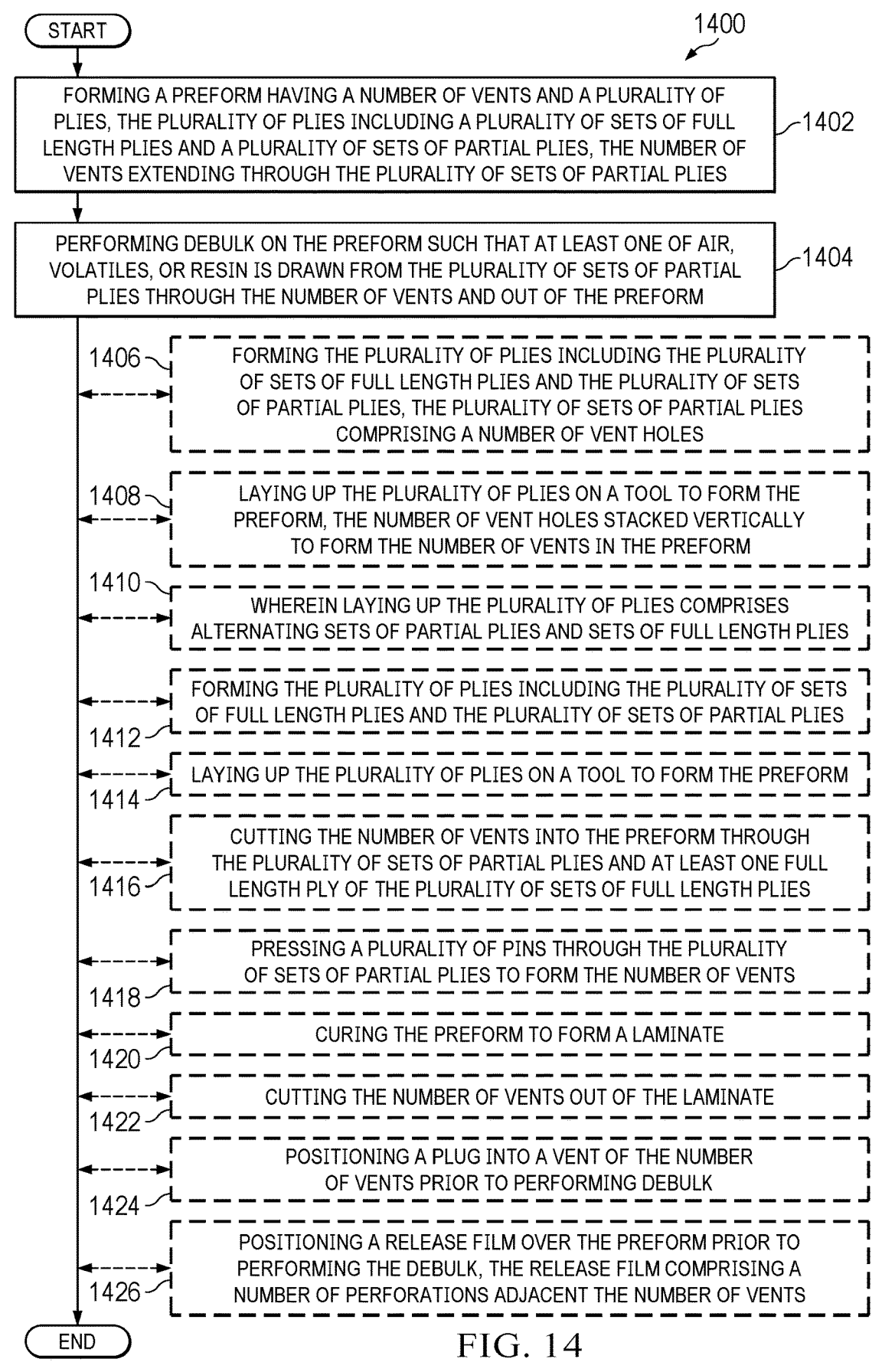

START

1400

FORMING A PREFORM HAVING A NUMBER OF VENTS AND A PLURALITY OF PLIES, THE PLURALITY OF PLIES INCLUDING A PLURALITY OF SETS OF FULL LENGTH PLIES AND A PLURALITY OF SETS OF PARTIAL PLIES, THE NUMBER OF VENTS EXTENDING THROUGH THE PLURALITY OF SETS OF PARTIAL PLIES — 1402

PERFORMING DEBULK ON THE PREFORM SUCH THAT AT LEAST ONE OF AIR, VOLATILES, OR RESIN IS DRAWN FROM THE PLURALITY OF SETS OF PARTIAL PLIES THROUGH THE NUMBER OF VENTS AND OUT OF THE PREFORM — 1404

1406 — FORMING THE PLURALITY OF PLIES INCLUDING THE PLURALITY OF SETS OF FULL LENGTH PLIES AND THE PLURALITY OF SETS OF PARTIAL PLIES, THE PLURALITY OF SETS OF PARTIAL PLIES COMPRISING A NUMBER OF VENT HOLES

1408 — LAYING UP THE PLURALITY OF PLIES ON A TOOL TO FORM THE PREFORM, THE NUMBER OF VENT HOLES STACKED VERTICALLY TO FORM THE NUMBER OF VENTS IN THE PREFORM

1410 — WHEREIN LAYING UP THE PLURALITY OF PLIES COMPRISES ALTERNATING SETS OF PARTIAL PLIES AND SETS OF FULL LENGTH PLIES

FORMING THE PLURALITY OF PLIES INCLUDING THE PLURALITY OF SETS OF FULL LENGTH PLIES AND THE PLURALITY OF SETS OF PARTIAL PLIES — 1412

LAYING UP THE PLURALITY OF PLIES ON A TOOL TO FORM THE PREFORM — 1414

CUTTING THE NUMBER OF VENTS INTO THE PREFORM THROUGH THE PLURALITY OF SETS OF PARTIAL PLIES AND AT LEAST ONE FULL LENGTH PLY OF THE PLURALITY OF SETS OF FULL LENGTH PLIES — 1416

PRESSING A PLURALITY OF PINS THROUGH THE PLURALITY OF SETS OF PARTIAL PLIES TO FORM THE NUMBER OF VENTS — 1418

CURING THE PREFORM TO FORM A LAMINATE — 1420

CUTTING THE NUMBER OF VENTS OUT OF THE LAMINATE — 1422

POSITIONING A PLUG INTO A VENT OF THE NUMBER OF VENTS PRIOR TO PERFORMING DEBULK — 1424

POSITIONING A RELEASE FILM OVER THE PREFORM PRIOR TO PERFORMING THE DEBULK, THE RELEASE FILM COMPRISING A NUMBER OF PERFORATIONS ADJACENT THE NUMBER OF VENTS — 1426

END

FIG. 14

PROCESSING OF COMPOSITES WITH PARTIAL PLIES

BACKGROUND INFORMATION

1. Field

The present disclosure relates generally to processing composite materials and more specifically to air extraction during composite processing.

2. Background

Composite materials are strong, light-weight materials created by combining two or more functional components. For example, a composite material may include reinforcing fibers bound in polymer resin matrix. The fibers can take the form of a unidirectional tape, woven cloth or fabric, or a braid.

In manufacturing composite structures, layers of composite material are typically laid up on a tool. The layers may be comprised of fibers in sheets. In some cases, resin may be infused or pre-impregnated into the sheets. These types of sheets are commonly referred to as prepreg.

Composite structures can have added localized reinforcement plies. Localized reinforcement (doubler) plies are partial plies that are interleaved through the stack of continuous plies. During heating of a composite structure, entrapped gas is released from the composite layup. However, gas can become trapped within the partial plies.

Therefore, it would be desirable to have a method and apparatus that takes into account at least some of the issues discussed above, as well as other possible issues. For example, it would be desirable to have a method and apparatus that allows for removal of entrapped gas from partial plies within a composite preform.

SUMMARY

An embodiment of the present disclosure provides a preform. The preform comprises a plurality of sets of full length plies, a plurality of sets of partial plies alternating with the plurality of sets of full length plies, and a vent extending through the plurality of sets of partial plies.

Another embodiment of the present disclosure provides a method of performing composite manufacturing. A release film comprising a number of perforations is positioned over a preform comprising a vent extending through a plurality of sets of partial plies of the preform such that the perforations are adjacent the vent. Debulk is performed on the preform such that at least one of air, volatiles, or resin is drawn from the plurality of sets of partial plies through the vent and the perforations of the release film.

Yet another embodiment of the present disclosure provides a method of forming a composite structure. A preform having a number of vents and a plurality of plies is formed, the plurality of plies including a plurality of sets of full length plies and a plurality of sets of partial plies, the number of vents extending through the plurality of sets of partial plies. Debulk is performed on the preform such that at least one of air, volatiles, or resin are drawn from the plurality of sets of partial plies through the number of vents and out of the preform.

A yet further embodiment of the present disclosure provides a method of forming a composite structure. Vacuum is applied to a preform having a vent and a plurality of sets of partial plies, the vent extending through the plurality of sets of partial plies. At least one of air, volatiles, or resin is drawn out of the plurality of sets of partial plies through the vent and into a breather.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is a flowchart of a method of forming a composite structure in accordance with an illustrative embodiment;

FIG. 14 is a flowchart of a method of forming a composite structure in accordance with an illustrative embodiment;

DETAILED DESCRIPTION

Figure 1:
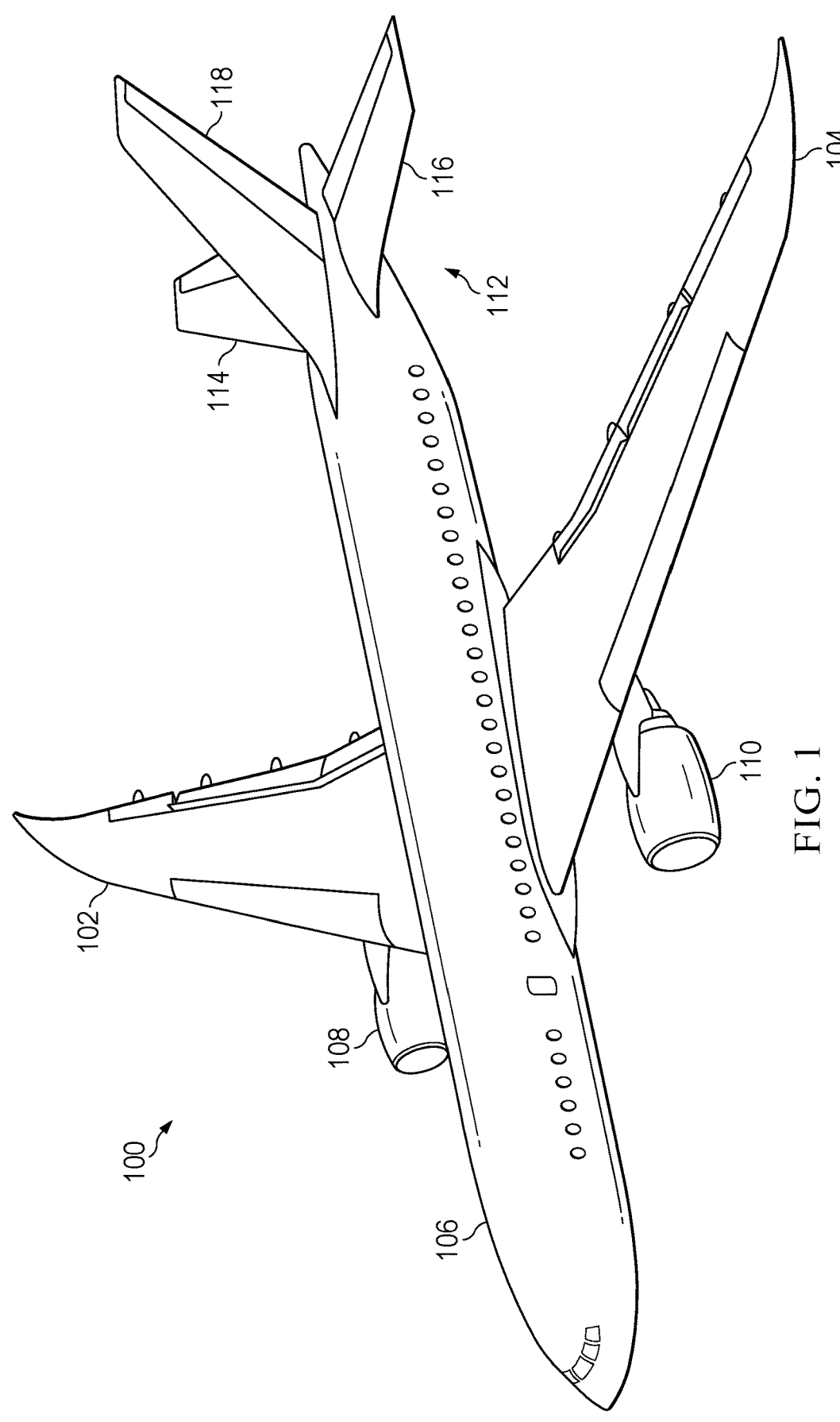
FIG. 1 is an illustration of an aircraft in accordance with an illustrative embodiment.

The illustrative examples recognize and take into account one or more different considerations. For example, the illustrative examples recognize and take into account that one advantage of composite structures is that it is easy to add localized reinforcement plies to the structure. These local reinforcements are used to strengthen the structure where through holes are used for windows, systems pass throughs, access holes, fasteners, and other features in subsequent manufacturing operations. The illustrative examples recognize and take into account that the localized doubler plies are interleaved through the stack of continuous plies.

Autoclaves are large and expensive tools used to provide heat and pressure to cure composite materials. Alternative curing methods have been developed that use faster or less expensive methods and tooling. Some of these alternative curing methods include vacuum bag only and double vacuum debulk processes.

The illustrative examples recognize and take into account that Vacuum Bag Only (VBO) and Double Vacuum Debulk (DVD) processed laminates can have localized porosity that coincides with doubler plies within the panel acreage that do not extend to the edge of the laminate. The illustrative examples recognize and take into account that these doubler plies, or pad ups, are engineered skin gauge increases to compensate for systems passthroughs, or fasteners patterns, that will be machined or drilled in future stages of assembly. The size and thickness of the pad up will vary with the specific application.

The illustrative examples recognize and take into account that nonautoclave processes rely heavily on edge breathing to extract the air from laminates. Vacuum is used to draw entrapped air down the length of the fiber tow to the edge of the part where it escapes the laminate. The illustrative examples recognize and take into account that when doubler plies do not extend to the edge of the part, the edges of the doubler plies are sealed off by the continuous plies above and below them. Edge breathing is not very affective in this scenario. The illustrative examples recognize and take into account that in the autoclave at 100 PSI the air entrapped air is forced into solution and does not result in undesirable levels of porosity. The illustrative examples recognize and take into account that parts cured at only one atmosphere of pressure can have undesirable levels of porosity in the pad up area due to entrapped air.

The DVD process works by canceling out the vacuum clamping pressure on the laminate. The elimination of the clamping pressure, combined with heating, allows any entrapped gas to travel down the length of the fiber tow to the edge of the part where it escapes. The illustrative examples recognize and take into account that when the doubler plies do not extend to the edge of the part it can be difficult for the DVD process to efficiently remove trapped air from between the doubler plies. The illustrative examples recognize and take into account that the continuous plies above and below the non-continuous plies block the exposed ply edges of the doubler and impede air extraction. The areas with localized doublers can have higher levels of porosity when processed using the Double Vacuum Debulk process.

The existing solutions to this problem are to use brute force, or to use extended pre-cure vacuum dwells. A brute force approach can be performed at 45 to 100 PSI. The illustrative examples recognize and take into account that a disadvantage to the brute force approach is the use of an autoclave.

Extended vacuum dwells can have a duration from four to twenty four hours. The larger the part the longer the pre-cure vacuum dwell. The illustrative examples recognize and take into account that in addition to the rate impact, the long vacuum dwells may not be effective.

The illustrative examples provide methods that extract the air through the laminate thickness directly from the localized pad up. The illustrative examples provide alternative methods to extended pre-cure vacuum dwells because the distance for the air to exit the preform is very short.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft with composite components that can be formed using the illustrative examples. In some illustrative examples, at least one of a portion of wing 102, wing 104, or body 106 can be formed using the methods of the illustrative examples.

Figure 2:
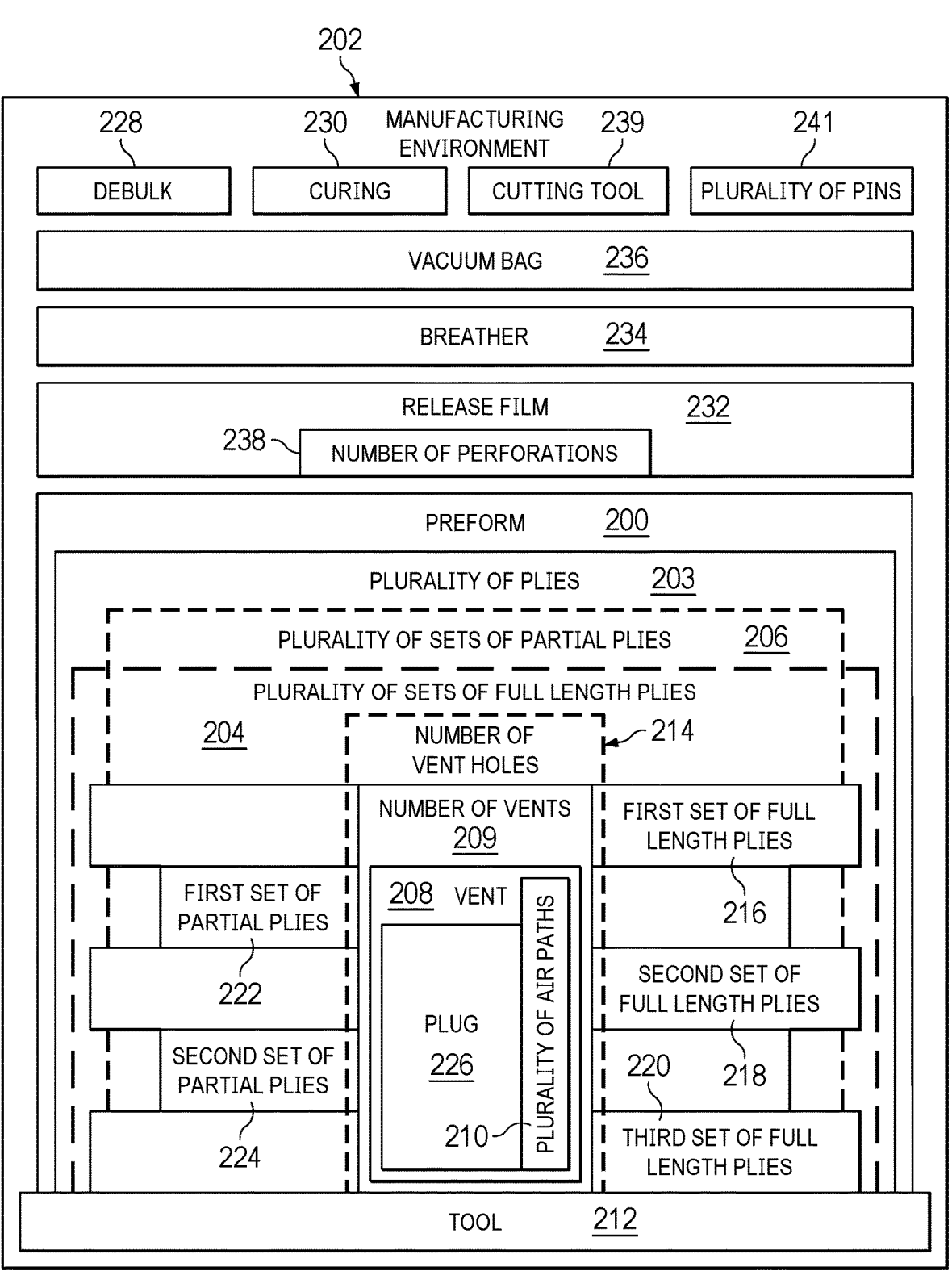
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Preform 200 in manufacturing environment 202 can be an example of a preform for forming a portion of aircraft 100 of FIG. 1.

Preform 200 is formed of plurality of plies 203. Plurality of plies 203 are formed of composite material. In some illustrative examples, plurality of plies 203 can be referred to as a plurality of pre-preg plies. Preform 200 comprises plurality of sets of full length plies 204, plurality of sets of partial plies 206 alternating with plurality of sets of full length plies 204, and vent 208 extending through plurality of sets of partial plies 206. Vent 208 provides plurality of air paths 210. Plurality of air paths 210 allow for release of entrapped air from plurality of sets of partial plies 206.

Vent 208 is one of number of vents 209. As used herein, "a number of," when used with reference to items means one or more items. In some illustrative examples, number of vents 209 comprises more than one vent.

Plurality of air paths 210 is formed by plurality of sets of partial plies 206 and vent 208. At least one of entrapped air, volatiles, and resin can travel along plurality of air paths 210. During debulk 228 at least one of entrapped air, volatiles, and resin can travel along a respective air path of plurality of air paths 210 by traveling along a respective set of partial plies and through vent 208. At least one of entrapped air or volatiles can travel through number of perforations 238 in release film 232.

Vent 208 extends through all of plurality of sets of partial plies 206. In some illustrative examples, vent 208 extends through an entirety of preform 200. In some illustrative examples, vent 208 extends through only a portion of preform 200.

In some illustrative examples, vent 208 is formed by laying up plurality of plies 203 on tool 212. In some illustrative examples, forming plurality of plies 203 includes plurality of sets of full length plies 204 and plurality of sets of partial plies 206, each partial ply of plurality of sets of partial plies 206 comprising a vent hole. In this illustrative example, plurality of sets of partial plies 206 and at least a portion of plurality of sets of full length plies 204 comprise number of vent holes 214. In some illustrative examples, number of vent holes 214 is cut into plurality of sets of partial plies 206 and at least a portion of plurality of sets of full length plies 204 using one or more cutting tools such as a laser, a CNC machine, or other type of cutting tool 239.

Plurality of plies 203 is laid up on tool 212 to form preform 200. When number of vent holes 214 is stacked vertically, number of vent holes 214 forms vent 208 in preform 200.

In some illustrative examples, vent 208 is formed by laying up plurality of plies 203. In some illustrative examples, vent 208 is formed during the layup process by omitting material.

In some illustrative examples, vent 208 is a cut into preform 200. After laying up plurality of plies 203, vent 208 can be cut into preform 200 by cutting tool.

Plurality of sets of full length plies 204 comprises any desirable quantity of full length plies. Plurality of sets of full length plies 204 can be any desirable quantity of sets of full length plies. Any desirable quantity of full length plies can be present in each set of full length plies. Full length plies extend out to the edges of preform 200.

Plurality of sets of partial plies 206 comprises any desirable quantity of partial length plies. Plurality of sets of partial plies 206 can be any desirable quantity of sets of partial length plies. Any desirable quantity of partial length plies can be present in each set of partial length plies.

In this illustrative example, plurality of sets of full length plies 204 comprises first set of full length plies 216, second set of full length plies 218, and third set of full length plies 220. In this illustrative example, plurality of sets of full length plies 204 is interleaved with plurality of sets of partial plies 206.

In this illustrative example, plurality of sets of partial plies 206 comprises first set of partial plies 222 and second set of partial plies 224. First set of partial plies 222 is positioned between first set of full length plies 216 and second set of full length plies 218. Second set of partial plies 224 is positioned between second set of full length plies 218 and third set of full length plies 220.

In this illustrative example, vent 208 extends through first set of full length plies 216, first set of partial plies 222, second set of full lengths plies 218, second set of partial plies 224, and third set of full length plies 220. In some illustrative examples, vent 208 can terminate prior to third set of full length plies 220.

After layup, in some illustrative examples, plug 226 is positioned within vent 208. In some illustrative examples, plug 226 is positioned within vent 208 prior to performing debulk 228 or curing 230 of preform 200. Plug 226 comprises a material configured to maintain its geometry during debulk 228 and curing 230 of preform 200. Plug 226 is formed of a material approved for contact with the composite material of preform 200. Plug 226 can be formed of polytetrafluoroethylene (PTFE), Cork, metal, or other desirable material.

In some illustrative examples, preform 200 comprises plurality of plies 203 including plurality of sets of full length plies 204 and plurality of sets of partial plies 206. Laying up plurality of plies 203 on tool 212 forms preform 200. After forming preform 200, plurality of pins 241 is pressed through plurality of sets of partial plies 206.

Pressing plurality of pins 241 locally displaces fibers of plurality of sets of partial plies 206 to create number of vents 209. In these illustrative examples, number of vents 209 can be referred to as vent paths. Vent paths allow for escape of air and other gases from plurality of sets of partial plies 206 during debulk and cure of preform 200.

The fibers of preform 200 would be permanently displaced by pushing plurality of pins 241 into plurality of sets of partial plies 206. A minor difference in material characteristics such as compression strength can result due to local crimping. Plurality of pins 241 is removed from preform 200 after processing.

After layup of preform 200, release film 232, breather 234, and vacuum bag 236 are placed over preform 200 to perform at least one of debulk 228 or curing 230. the release film comprising at least one perforation adjacent the vent Perforations will allow gas to pass through release film 232 (separator) into breather 234 covering preform 200.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of sets of full length plies 204 can include any desirable quantity of sets of plies. In some illustrative examples, plurality of sets of full length plies 204 has more than three sets of full length plies. In some illustrative examples, plurality of sets of full length plies 204 has less than three sets of full length plies.

As another example, plurality of sets of partial plies 206 can include any desirable quantity of sets of plies. In some illustrative examples, plurality of sets of partial plies 206 has less than one set of partial plies. In some illustrative examples, plurality of sets of partial plies 206 has more than two sets of partial plies.

As yet another example, debulk 228 can take any desirable form of debulking. In some illustrative examples, debulk 228 can be a double vacuum debulk (DVD).

Figure 3:
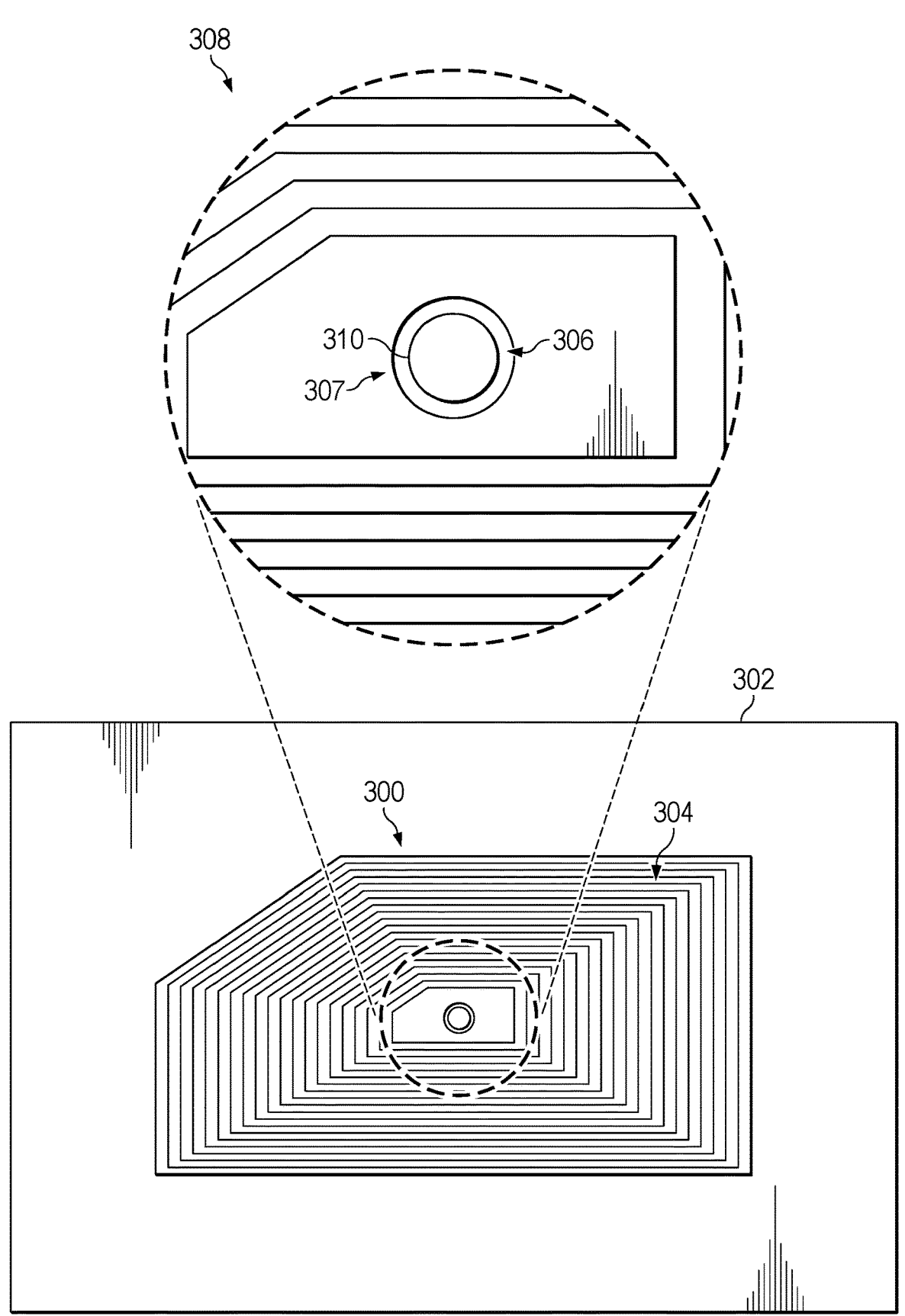
FIG. 3 is an illustration of a top view of a layup of a composite preform in accordance with an illustrative embodiment.

Turning now to FIG. 3, an illustration of a top view of a layup of a composite preform is depicted in accordance with an illustrative embodiment. Composite preform is a physical implementation of preform 200 of FIG. 2.

Preform 300 is laid up on tool 302. Preform 300 comprises step-downs 304 formed by series of partial plies in preform 300. Vent 306 extends through at least a portion of preform 300. Vent 306 extends through each partial ply of a plurality of sets of partial plies in preform 300.

In view 308, plug 310 is placed within vent 306. Plug 310 is positioned prior to debulk of preform 300.

In some illustrative examples, vent 306 is formed by laying up layers of preform 300 on tool 302. In these illustrative examples, vent 306 is formed of a number of vent holes formed in the plurality of partial plies and at least a portion of the full length plies prior to stacking the plies to form preform 300 on tool 302. In these illustrative examples, the number of vent holes are stacked over each other to form vent 306.

In other illustrative examples, vent 306 is formed after preform 300 is laid up on tool 302. In some of these illustrative examples, vent 306 is cut into preform 300 after preform 300 is laid up on tool 302.

Figure 4:
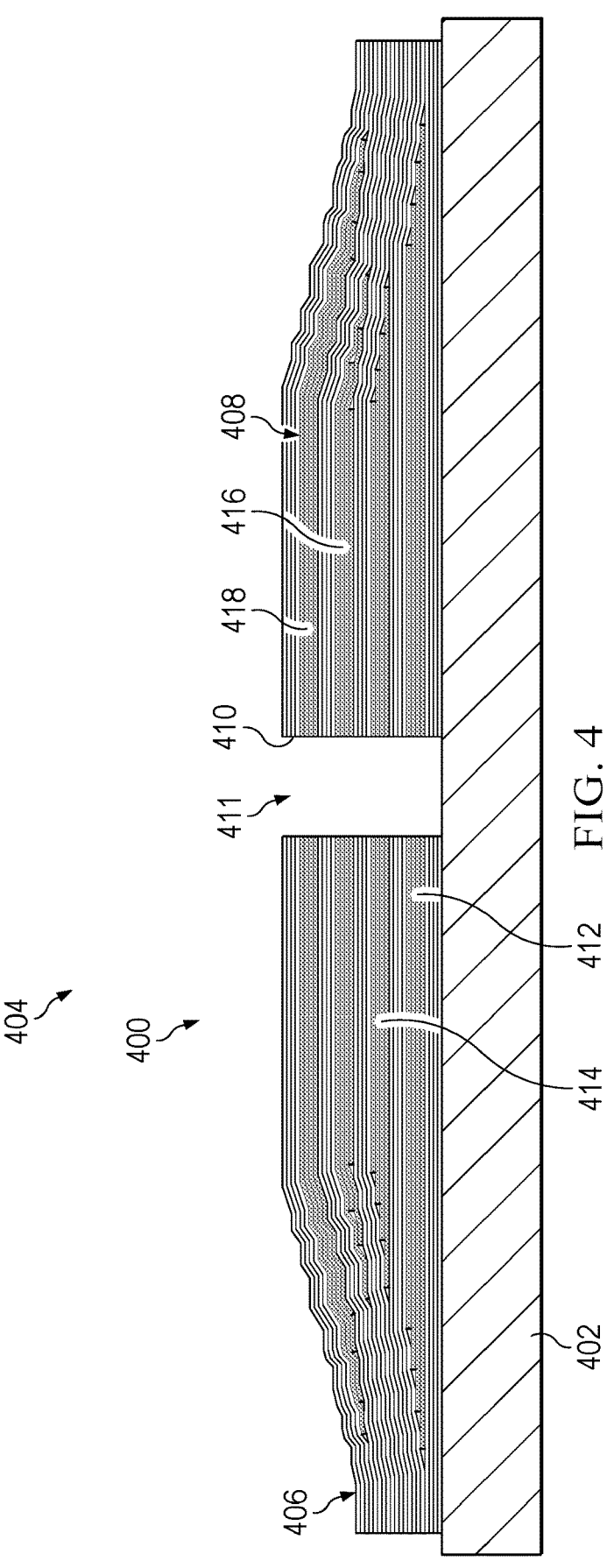
FIG. 4 is an illustration of a cross-sectional view of a layup of a composite preform in accordance with an illustrative embodiment.

Turning now to FIG. 4, an illustration of a cross-sectional view of a layup of a composite preform is depicted in accordance with an illustrative embodiment. Preform 400 is a physical implementation of preform 200 of FIG. 2. Preform 400 is laid-up on tool 402. In view 404, preform 400 comprises plurality of sets of full length plies 406 and plurality of sets of partial plies 408. Number of vent holes 410 extends through plurality of sets of partial plies 408. In this illustrative example, number of vent holes 410 comprises vent 411.

In this illustrative example, plurality of sets of partial plies 408 comprises first set of partial plies 412, second set of partial plies 414, third set of partial plies 416, and fourth set of partial plies 418. In this illustrative example, vent 411 extends through each of first set of partial plies 412, second set of partial plies 414, third set of partial plies 416, and fourth set of partial plies 418. In this illustrative example, vent 411 extends through each of plurality of sets of full length plies 406.

Figure 5:
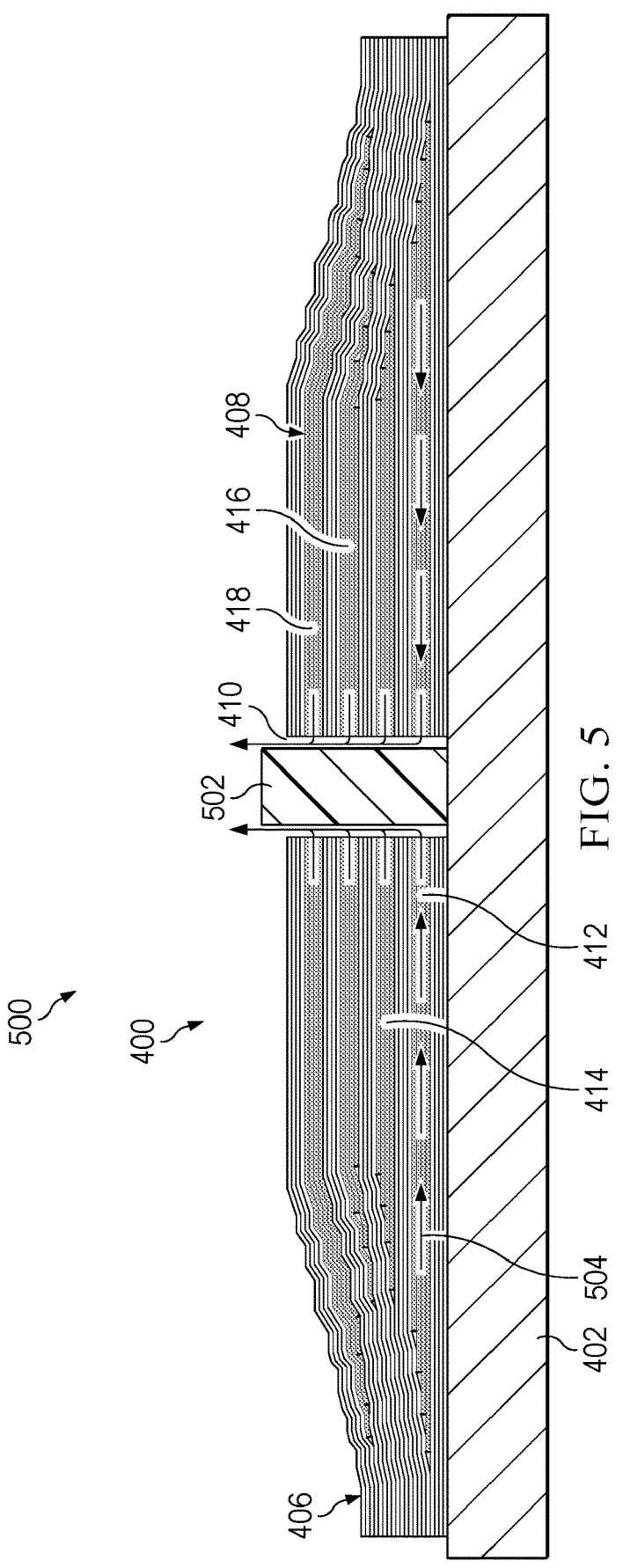
FIG. 5 is an illustration of a cross-sectional view of a layup of a composite preform in accordance with an illustrative embodiment.

Turning now to FIG. 5, an illustration of a cross-sectional view of a layup of a composite preform is depicted in accordance with an illustrative embodiment. View 500 is a view of preform 400 prior to curing. In view 500, plug 502 has been placed in vent 411. Plug 502 maintains the shape of vent 411 during debulk and curing. Plug 502 also prevents excess resin from leaving preform 400 and creating a resin starved area in preform 400 surrounding vent 411.

Figure 6:
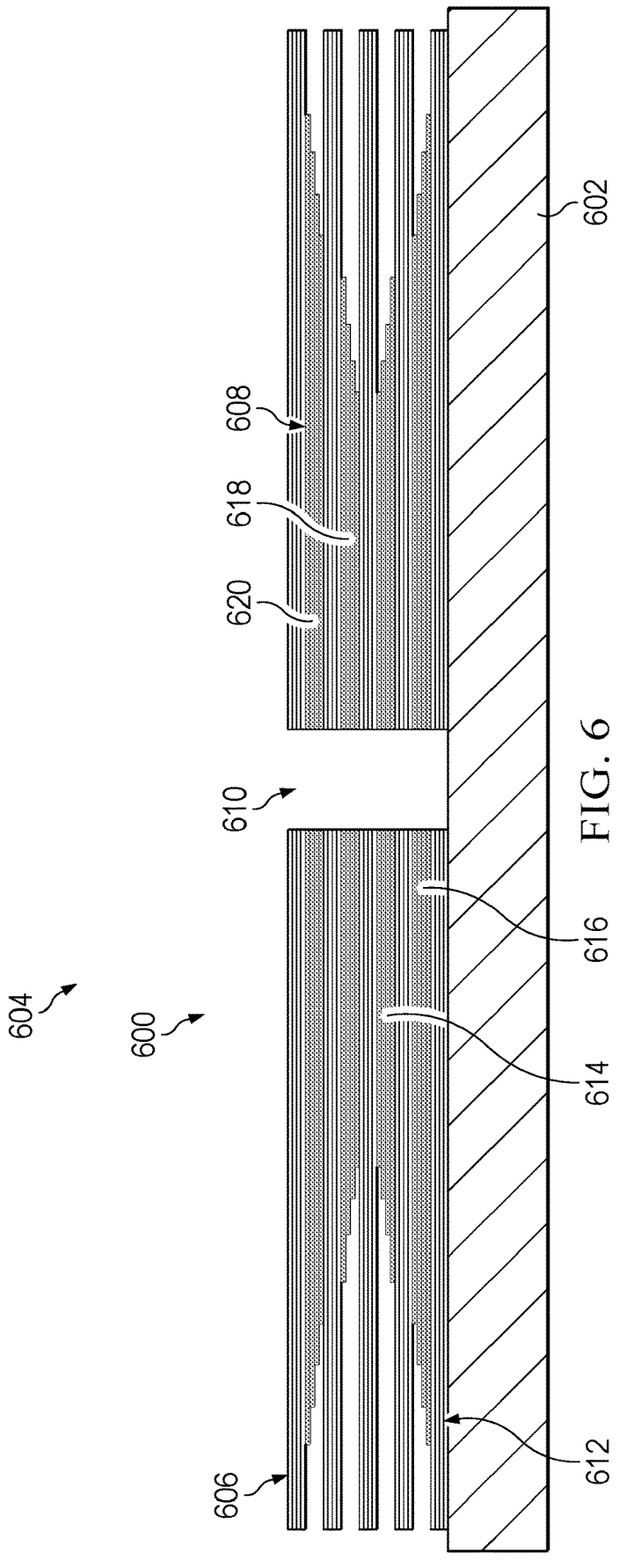
FIG. 6 is an illustration of a cross-sectional view of a layup of a composite preform in accordance with an illustrative embodiment.

Turning now to FIG. 6, an illustration of a cross-sectional view of a layup of a composite preform is depicted in accordance with an illustrative embodiment. Preform 600 is a physical implementation of preform 200 of FIG. 2. Preform 600 is laid up on tool 602. In view 604 plurality of sets of full length plies 606 and plurality of sets of partial plies 608 are visible. Vent 610 extends through each of plurality of sets of partial plies 608. Vent 610 extends through only a portion of plurality of sets of full length plies 606. For example, vent 610 does not extend through set of full length plies 612.

As depicted, vent 610 extends through set of partial plies 614, set of partial plies 616, set of partial plies 618, set of partial plies 618 and all sets of full length plies above and between plurality of sets of partial plies 608. By vent 610 extending through each of plurality of sets of partial plies 608 and all sets of full length plies above and between plurality of sets of full length plies 606, air paths are created to vent air and other gasses from plurality of sets of partial plies 608. The air paths are formed by each of plurality of sets of partial plies 608 and vent 610. At least one of entrapped air, volatiles, and resin can travel along the air paths.

Figure 7:
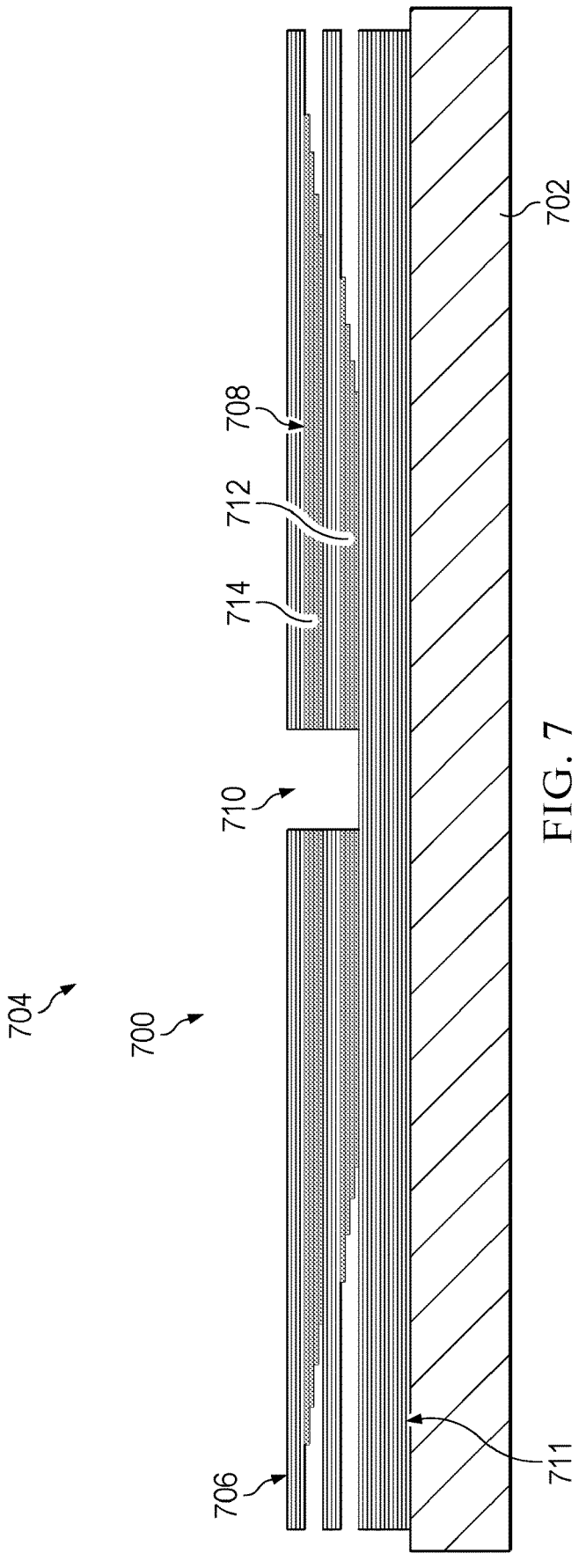
FIG. 7 is an illustration of a cross-sectional view of a layup of a composite preform in accordance with an illustrative embodiment.

Turning now to FIG. 7, an illustration of a cross-sectional view of a layup of a composite preform is depicted in accordance with an illustrative embodiment. Preform 700 is a physical implementation of preform 200 of FIG. 2. Preform 700 is laid up on tool 702. In view 704, preform 700 comprises plurality of sets of full length plies 706 and plurality of sets of partial plies 708. Vent 710 extends through each of plurality of sets of partial plies 708. Vent 710 extends through only a portion of plurality of sets of full length plies 706. For example, vent 710 does not extend through sets of full length plies 711.

As depicted, vent 710 extends through set of partial plies 712, set of partial plies 714, and all sets of full length plies above and between plurality of sets of partial plies 708. By vent 710 extending through each of plurality of sets of partial plies 708 and all sets of full length plies above and between plurality of sets of full length plies 706, air paths are created to vent air and other gasses from plurality of sets of partial plies 708. The air paths are formed by each of plurality of sets of partial plies 708 and vent 710. At least one of entrapped air, volatiles, and resin can travel along the air paths.

Figure 8:
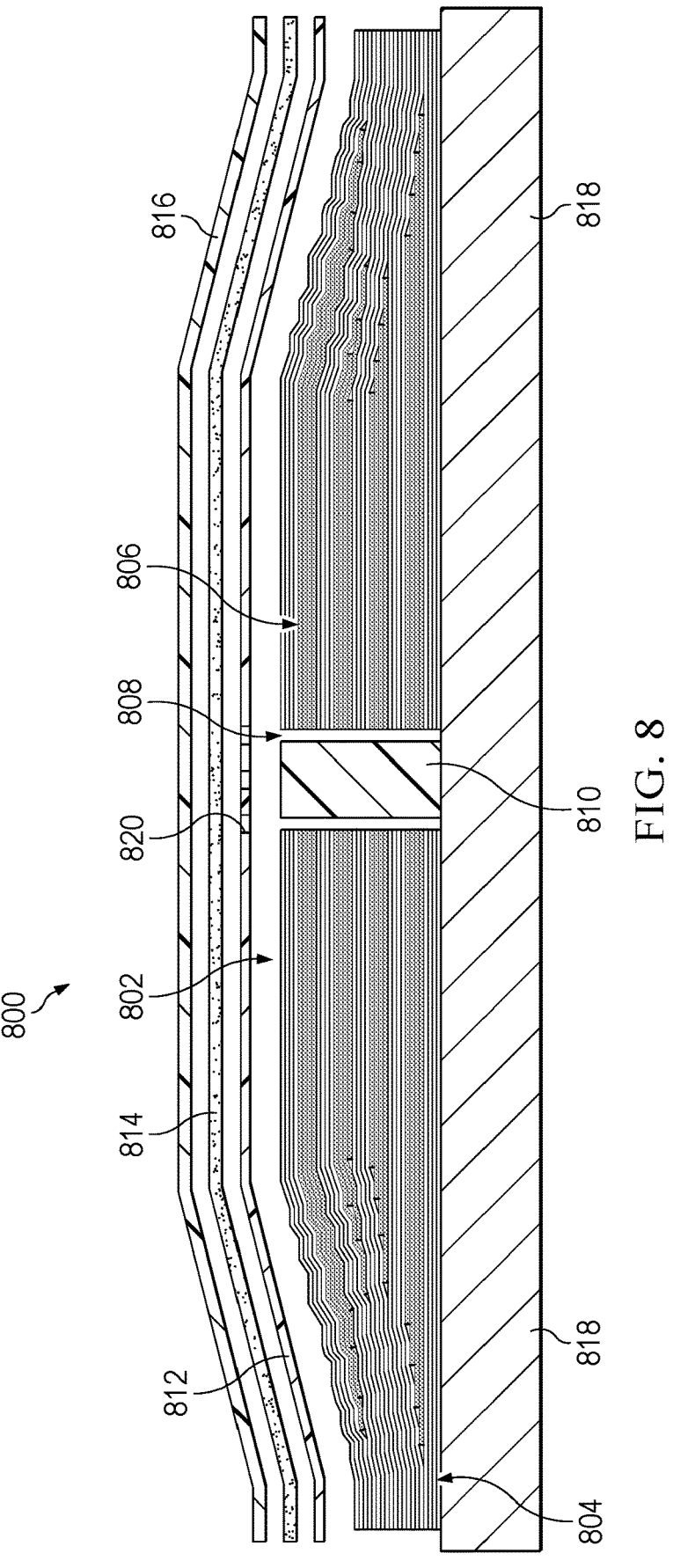
FIG. 8 is an illustration of a cross-sectional view of a layup of a composite preform with vacuum bagging materials in accordance with an illustrative embodiment.

Turning now to FIG. 8, an illustration of a cross-sectional view of a layup of a composite preform with vacuum bagging materials is depicted in accordance with an illustrative embodiment. In view 800, preform 802 has been laid up on tool 818. Preform 802 is a physical implementation of preform 200 of FIG. 2.

Preform 802 comprises plurality of sets of full length plies 804 interleaved with plurality of sets of partial plies 806. Vent 808 extends through the thickness of preform 802. Vent 808 extends through plurality of sets of full length plies 804 and plurality of sets of partial plies 806.

In this illustrative example, plug 810 is present in vent 808. Release film 812, breather 814, and vacuum bag 816 are positioned over preform 802. Vacuum bag 816 will be sealed to tool 818 to perform curing or debulk. In this illustrative example, release film 812 comprises perforations 820 positioned over vent 808. Perforations 820 allow gases from plurality of sets of partial plies 806 to travel from vent 808 to breather 814.

Figure 9:
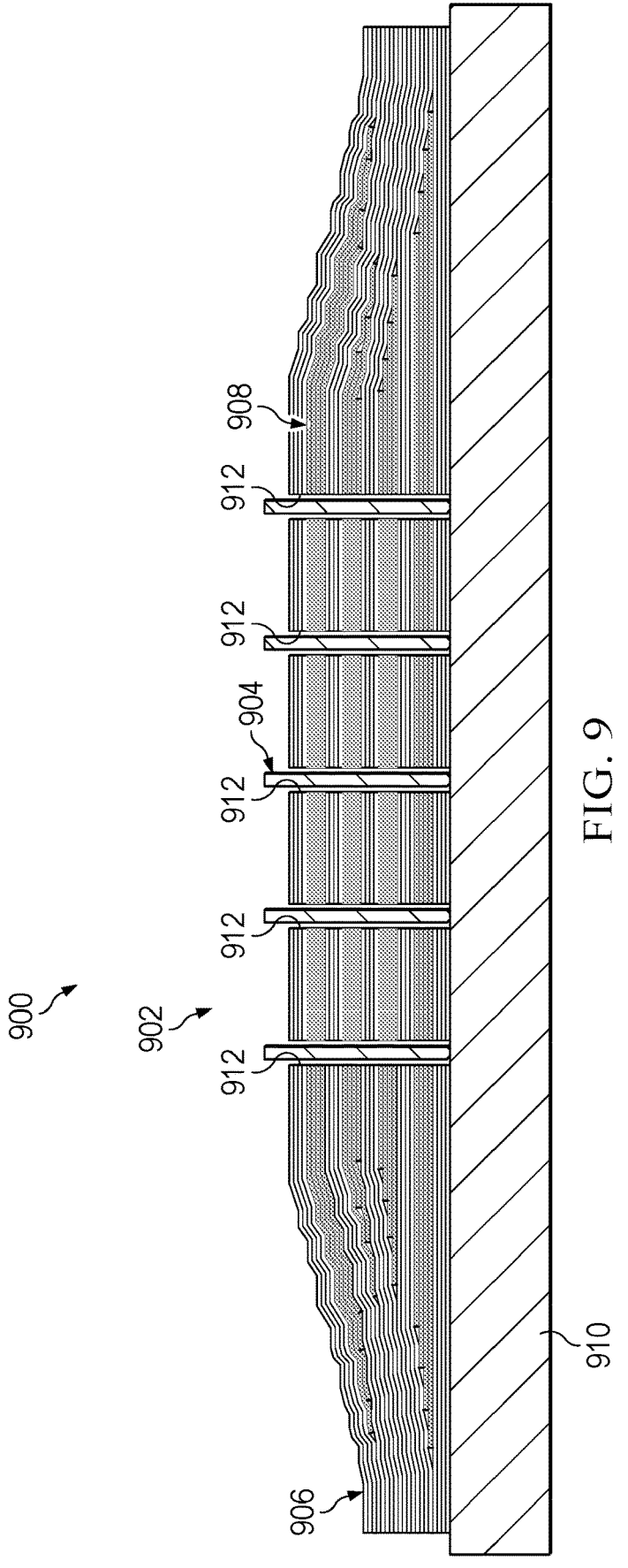
FIG. 9 is an illustration of a cross-sectional view of a layup of a composite preform with a plurality of pins in accordance with an illustrative embodiment.

Turning now to FIG. 9, an illustration of a cross-sectional view of a layup of a composite preform with a plurality of pins is depicted in accordance with an illustrative embodiment. View 900 is a view of preform 902 with plurality of pins 904. Preform 902 comprises plurality of plies 905 including plurality of sets of full length plies 906 and plurality of sets of partial plies 908. Laying up plurality of plies 905 on tool 910 forms preform 902. After forming preform 902, plurality of pins 904 is pressed through plurality of sets of partial plies 908.

Pressing plurality of pins 904 locally displaces fibers of plurality of sets of partial plies 908 to create vent paths 912. Vent paths 912 allow for escape of air and other gases from plurality of sets of partial plies 908 during debulk and cure of preform 902.

The fibers of preform 902 would be permanently displaced. A minor difference in material characteristics such as compression strength can result due to local crimping. Plurality of pins 904 are removed from preform 902 after processing.

In some illustrative examples, prior to debulking or curing, a release film (not depicted) comprising a number of openings is positioned over the plurality of pins and preform 902. The number of openings positioned over plurality of pins 904 allows for gases from vent paths 912 to escape to a breather film.

In this illustrative example, vent paths 912 formed by plurality of pins 904 can be used in locations without future access holes, windows, systems passthroughs, or other removed portions. In this illustrative example, vent paths 912 are used instead of a single vent formed or cut into preform 902.

Figure 10:
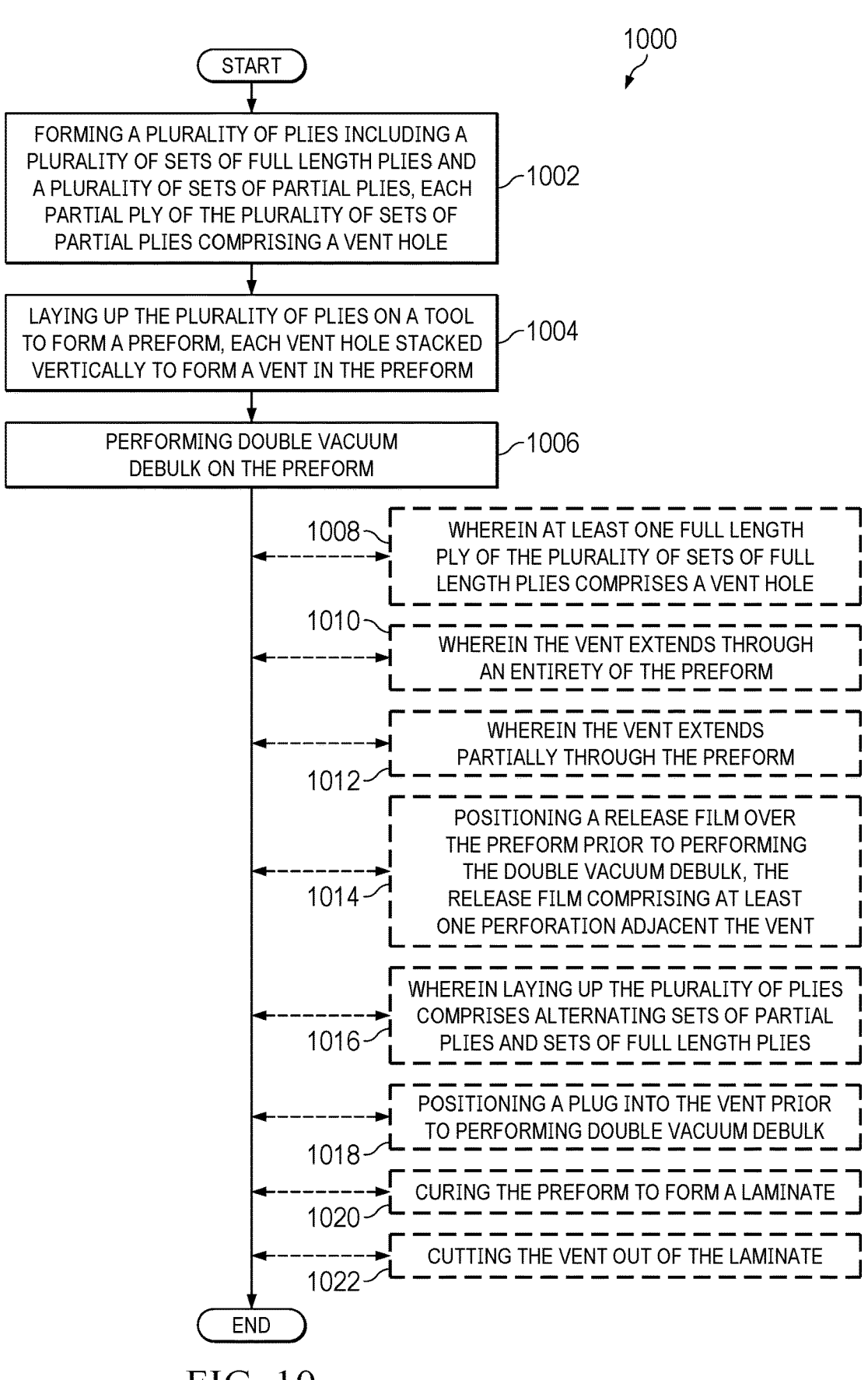
FIG. 10 is a flowchart of a method of forming a composite structure in accordance with an illustrative embodiment.

Turning now to FIG. 10, a flowchart of a method of forming a composite structure is depicted in accordance with an illustrative embodiment. Method 1000 can be used to form a component of aircraft 100 of FIG. 1. Method 1000 can be used to form a composite structure using preform 200 of FIG. 2. Method 1000 can be performed on preform 300 of FIG. 3. Method 1000 can be performed on preform 400 of FIGS. 4-5. Method 1000 can be performed on preform 600 of FIG. 6. Method 1000 can be performed on preform 700 of FIG. 7. Method 1000 can be performed on preform 802 of FIG. 8. Method 1000 can be performed on preform 902 of FIG. 9.

Method 1000 forms a plurality of plies including a plurality of sets of full length plies and a plurality of sets of partial plies, each partial ply of the plurality of sets of partial plies comprising a vent hole (operation 1002). Method 1000 lays up the plurality of plies on a tool to form a preform, each vent hole stacked vertically to form a vent in the preform (operation 1004). Method 1000 performs debulk on the preform (operation 1006). Afterwards, method 1000 terminates.

In some illustrative examples, at least one full length ply of the plurality of sets of full length plies comprises a vent hole (operation 1008). The full length plies above the partial plies of the plurality of sets of partial plies will comprise a vent hole. The full length plies between the partial plies of the plurality of sets of partial plies will comprise a vent hole.

In some illustrative examples, the vent extends through an entirety of the preform (operation 1010). In some illustrative examples, the vent extends partially through the preform (operation 1012).

In some illustrative examples, positioning a release film over the preform prior to performing the debulk, the release film comprising at least one perforation adjacent the vent (operation 1014). The at least one perforation allows for gases from the vent to travel through the release film via the at least one perforation and to a breather layer.

In some illustrative examples, laying up the plurality of plies comprises alternating sets of partial plies and sets of full length plies (operation 1016).

In some illustrative examples, method 1000 positions a plug into the vent prior to performing debulk (operation 1018). When present, a plug can reduce migration of resin into the vent during cure.

In some illustrative examples, method 1000 cures the preform to form a laminate (operation 1020). In some illustrative examples, method 1000 cuts the vent out of the laminate (operation 1022). The vent can be cut out of the laminate to form an access hole, a system pass-through a fastener location, or other desirable feature.

Figure 11:
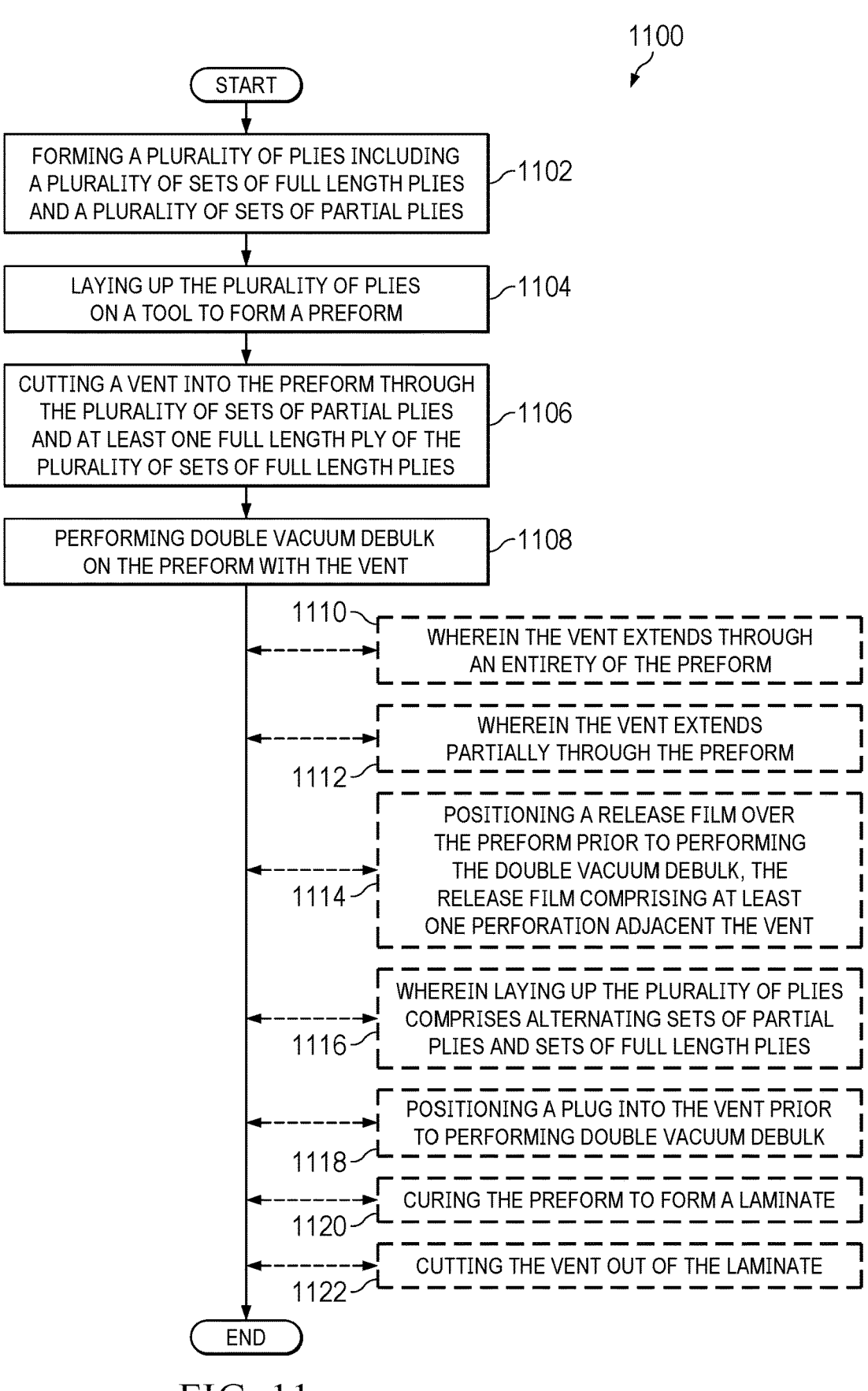
FIG. 11 is a flowchart of a method of forming a composite structure in accordance with an illustrative embodiment.

Turning now to FIG. 11, a flowchart of a method of forming a composite structure is depicted in accordance with an illustrative embodiment. Method 1100 can be used to form a component of aircraft 100 of FIG. 1. Method 1100 can be used to form a composite structure using preform 200 of FIG. 2. Method 1100 can be performed on preform 300 of FIG. 3. Method 1100 can be performed on preform 400 of FIGS. 4-5. Method 1100 can be performed on preform 600 of FIG. 6. Method 1100 can be performed on preform 700 of FIG. 7. Method 1100 can be performed on preform 802 of FIG. 8. Method 1100 can be performed on preform 902 of FIG. 9.

Method 1100 forms a plurality of plies including a plurality of sets of full length plies and a plurality of sets of partial plies (operation 1102). Method 1100 lays up the plurality of plies on a tool to form a preform (operation 1104). Method 1100 cuts a vent into the preform through the plurality of sets of partial plies and at least one full length ply of the plurality of sets of full length plies (operation 1106). Method 1100 performs debulk on the preform with the vent (operation 1108). Afterwards, method 1100 terminates.

In some illustrative examples, the vent extends through an entirety of the preform (operation 1110). In some illustrative examples, the vent extends partially through the preform (operation 1112).

In some illustrative examples, method 1100 positions a release film over the preform prior to performing the debulk, the release film comprising at least one perforation adjacent the vent (operation 1114). The at least one perforation allows for gases from the vent to travel through the release film via the at least one perforation and to a breather layer.

In some illustrative examples, laying up the plurality of plies comprises alternating sets of partial plies and sets of full length plies (operation 1116).

In some illustrative examples, method 1100 positions a plug into the vent prior to performing debulk (operation 1118). When present, a plug can reduce migration of resin into the vent during cure.

In some illustrative examples, method 1100 cures the preform to form a laminate (operation 1120). In some illustrative examples, method 1100 cuts the vent out of the laminate (operation 1122). The vent can be cut out of the laminate to form an access hole, a system pass-through a fastener location, or other desirable feature.

Figure 12:
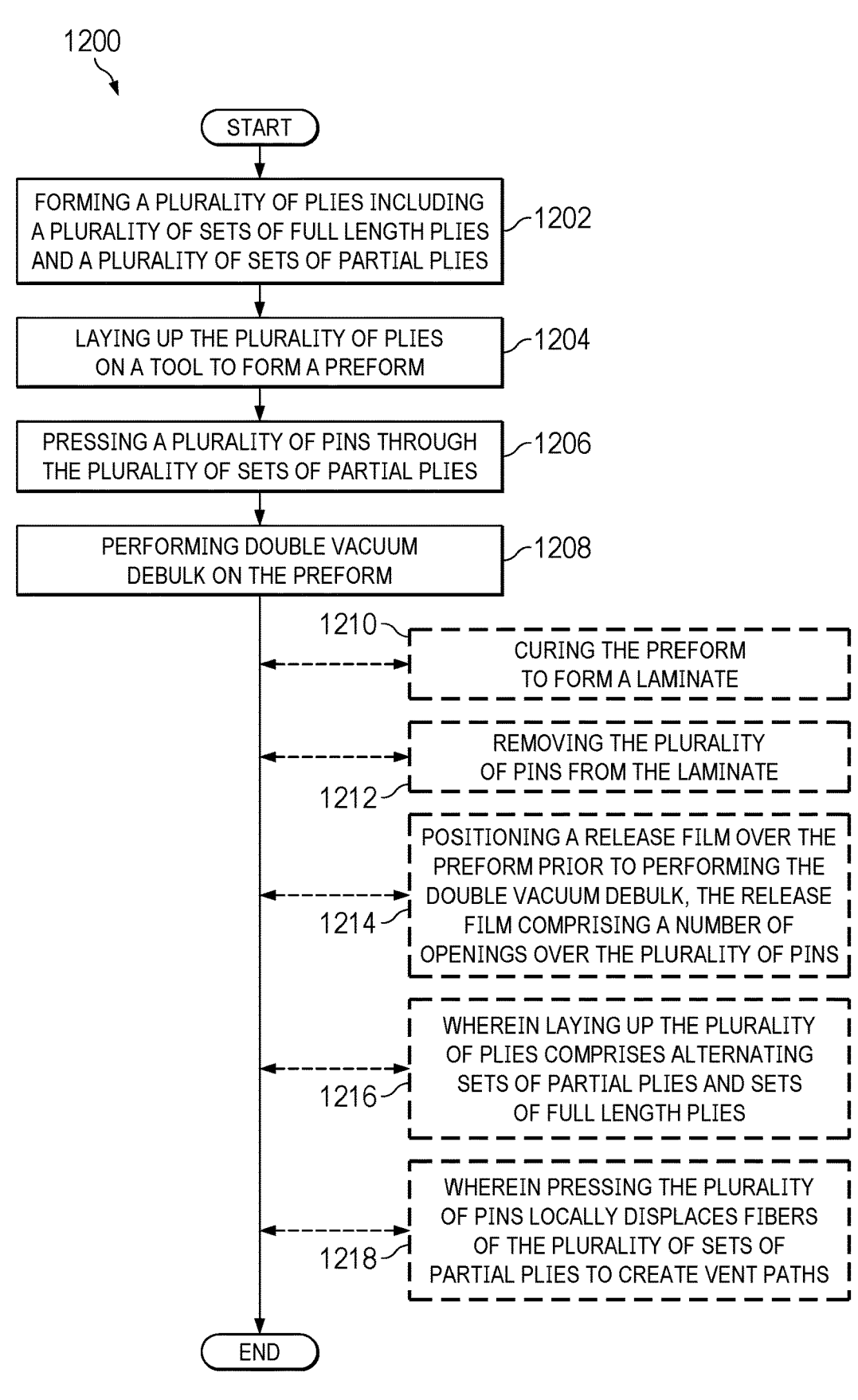
FIG. 12 is a flowchart of a method of forming a composite structure in accordance with an illustrative embodiment.

Turning now to FIG. 12, a flowchart of a method of forming a composite structure is depicted in accordance with an illustrative embodiment. Method 1200 can be used to form a component of aircraft 100 of FIG. 1. Method 1200 can be used to form a composite structure using preform 200 of FIG. 2. Method 1200 can be performed on preform 300 of FIG. 3. Method 1200 can be performed on preform 400 of FIGS. 4-5. Method 1200 can be performed on preform 600 of FIG. 6. Method 1200 can be performed on preform 700 of FIG. 7. Method 1200 can be performed on preform 802 of FIG. 8. Method 1200 can be performed on preform 902 of FIG. 9.

Method 1200 forms a plurality of plies including a plurality of sets of full length plies and a plurality of sets of partial plies (operation 1202). Method 1200 lays up the plurality of plies on a tool to form a preform (operation 1204). Method 1200 presses a plurality of pins through the plurality of sets of partial plies (operation 1206). Method 1200 performs debulk on the preform (operation 1208). Afterwards, method 1200 terminates.

In some illustrative examples, method 1200 cures the preform to form a laminate (operation 1210). In some illustrative examples, method 1100 removes the plurality of pins from the laminate (operation 1212).

In some illustrative examples, method 1200 positions a release film over the preform prior to performing the debulk, the release film comprising a number of openings over the plurality of pins (operation 1214). The number of openings allows for gases from the plurality of sets of partial plies to travel through the release film via the number of openings and to a breather layer.

In some illustrative examples, laying up the plurality of plies comprises alternating sets of partial plies and sets of full length plies (operation 1216). In some illustrative examples, pressing the plurality of pins locally displaces fibers of the plurality of sets of partial plies to create vent paths (operation 1218).

Turning now to FIG. 13, a flowchart of a method of forming a composite structure is depicted in accordance with an illustrative embodiment. Method 1300 can be used to form a component of aircraft 100 of FIG. 1. Method 1300 can be used to form a composite structure using preform 200 of FIG. 2. Method 1300 can be performed on preform 300 of FIG. 3. Method 1300 can be performed on preform 400 of FIGS. 4-5. Method 1300 can be performed on preform 600 of FIG. 6. Method 1300 can be performed on preform 700 of FIG. 7. Method 1300 can be performed on preform 802 of FIG. 8. Method 1300 can be performed on preform 902 of FIG. 9.

Method 1300 positions a release film comprising a number of perforations over a preform comprising a vent extending through a plurality of sets of partial plies of the preform such that the perforations are adjacent the vent (operation 1302). Method 1300 performs debulk on the preform such that at least one of air, volatiles, or resin is drawn from the plurality of sets of partial plies through the vent and the perforations of the release film (operation 1304). Afterwards, method 1300 terminates.

In some illustrative examples, the at least one of air, volatiles, or resin travel along a plurality of air paths formed by each set of partial plies of the plurality of sets of partial plies and the vent to exit the preform during the debulk (operation 1306).

In some illustrative examples, method 1300 positions a plug into the vent prior to performing debulk (operation 1308). In some illustrative examples, method 1300 cures the preform to form a laminate after performing the debulk (operation 1310). In some illustrative examples, method 1300 cuts the vent out of the laminate (operation 1312).

In some illustrative examples, method 1300 forms a plurality of plies including a plurality of sets of full length plies and the plurality of sets of partial plies, each partial ply of the plurality of sets of partial plies comprising a vent hole (operation 1314). In some illustrative examples, method 1300 lays up the plurality of plies on a tool to form the preform, each vent hole stacked vertically to form the vent in the preform (operation 1316).

In some illustrative examples, laying up the plurality of plies comprises alternating sets of partial plies and sets of full length plies (operation 1318). In some illustrative examples, method 1300 forms a plurality of plies including a plurality of sets of full length plies and the plurality of sets of partial plies (operation 1320). In some illustrative examples, method 1300 lays up the plurality of plies on a tool to form the preform (operation 1322). In some illustrative examples, method 1300 cuts the vent into the preform through the plurality of sets of partial plies and at least one full length ply of the plurality of sets of full length plies (operation 1324).

In some illustrative examples, method 1300 presses a plurality of pins through the plurality of sets of partial plies to form a number of vents including the vent (operation 1326). In some illustrative examples, pressing the plurality of pins locally displaces fibers of the plurality of sets of partial plies to create vent paths (operation 1328).

Turning now to FIG. 14, a flowchart of a method of forming a composite structure is depicted in accordance with an illustrative embodiment. Method 1400 can be used to form a component of aircraft 100 of FIG. 1. Method 1400 can be used to form a composite structure using preform 200 of FIG. 2. Method 1400 can be performed on preform 300 of FIG. 3. Method 1400 can be performed on preform 400 of FIGS. 4-5. Method 1400 can be performed on preform 600 of FIG. 6. Method 1400 can be performed on preform 700 of FIG. 7. Method 1400 can be performed on preform 802 of FIG. 8. Method 1400 can be performed on preform 902 of FIG. 9.

Method 1400 forms a preform having a number of vents and a plurality of plies, the plurality of plies including a plurality of sets of full length plies and a plurality of sets of partial plies, the number of vents extending through the plurality of sets of partial plies (operation 1402). Method 1400 performs debulk on the preform such that at least one of air, volatiles, or resin are drawn from the plurality of sets of partial plies through the number of vents and out of the preform (operation 1404). Afterwards, method 1400 terminates.

In some illustrative examples, method 1400 forms the plurality of plies including the plurality of sets of full length plies and the plurality of sets of partial plies, the plurality of sets of partial plies comprising a number of vent holes (operation 1406). In some illustrative examples, method 1400 lays up the plurality of plies on a tool to form the preform, the number of vent holes stacked vertically to form the number of vents in the preform (operation 1408). In some illustrative examples, laying up the plurality of plies comprises alternating sets of partial plies and sets of full length plies (operation 1410).

In some illustrative examples, method 1400 forms the plurality of plies including the plurality of sets of full length plies and the plurality of sets of partial plies (operation 1412). In some illustrative examples, method 1400 lays up the plurality of plies on a tool to form the preform (operation 1414). In some illustrative examples, method 1400 cuts the number of vents into the preform through the plurality of sets of partial plies and at least one full length ply of the plurality of sets of full length plies (operation 1416).

In some illustrative examples, method 1400 presses a plurality of pins through the plurality of sets of partial plies to form the number of vents (operation 1418).

In some illustrative examples, the number of vents extends through an entirety of the preform. In some illustrative examples, the number of vents extends partially through the preform.

In some illustrative examples, method 1400 positions a release film over the preform prior to performing the debulk, the release film comprising a number of perforations adjacent the number of vents (operation 1426). In some illustrative examples, method 1400 positions a plug into a vent of the number of vents prior to performing debulk (operation 1424). In some illustrative examples, method 1400 cures the preform to form a laminate (operation 1420). In some illustrative examples, method 1400 cuts the number of vents out of the laminate (operation 1422).

Figure 15:
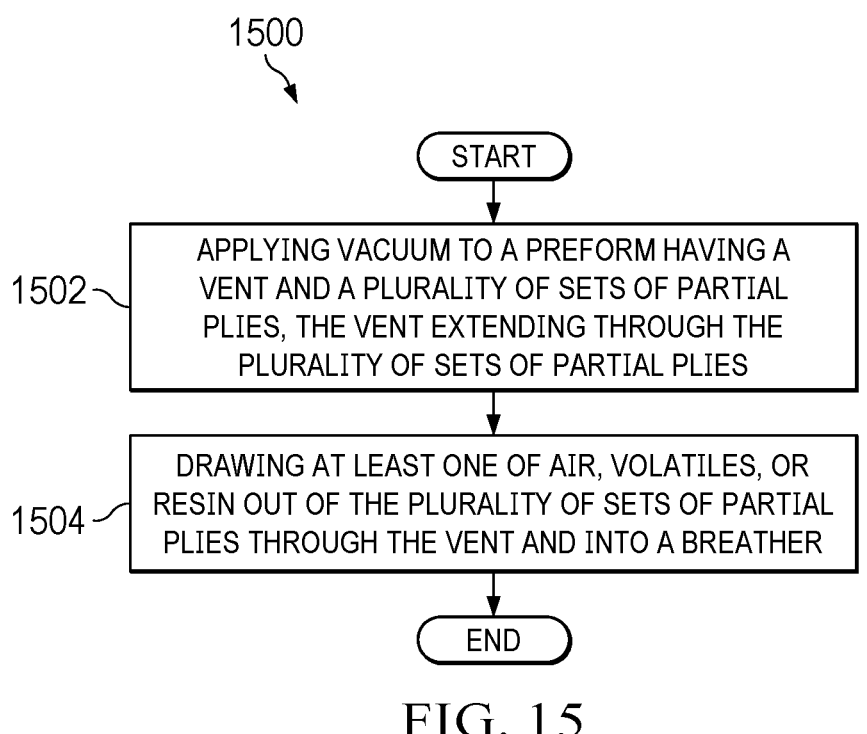
FIG. 15 is a flowchart of a method of forming a composite structure in accordance with an illustrative embodiment.

Turning now to FIG. 15, a flowchart of a method of forming a composite structure is depicted in accordance with an illustrative embodiment. Method 1500 can be used to form a component of aircraft 100 of FIG. 1. Method 1500 can be used to form a composite structure using preform 200 of FIG. 2. Method 1500 can be performed on preform 300 of FIG. 3. Method 1500 can be performed on preform 400 of FIGS. 4-5. Method 1500 can be performed on preform 600 of FIG. 6. Method 1500 can be performed on preform 700 of FIG. 7. Method 1500 can be performed on preform 802 of FIG. 8. Method 1500 can be performed on preform 902 of FIG. 9.

Method 1500 applies vacuum to a preform having a vent and a plurality of sets of partial plies, the vent extending through the plurality of sets of partial plies (operation 1502). Method 1500 draws at least one of air, volatiles, or resin out of the plurality of sets of partial plies through the vent and into a breather (operation 1504). Afterwards, method 1500 terminates.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1008 through operation 1022 may be optional. For example, operation 1110 through operation 1122 may be optional. As another example, operation 1210 through operation 1218 may be optional.

Figure 16:
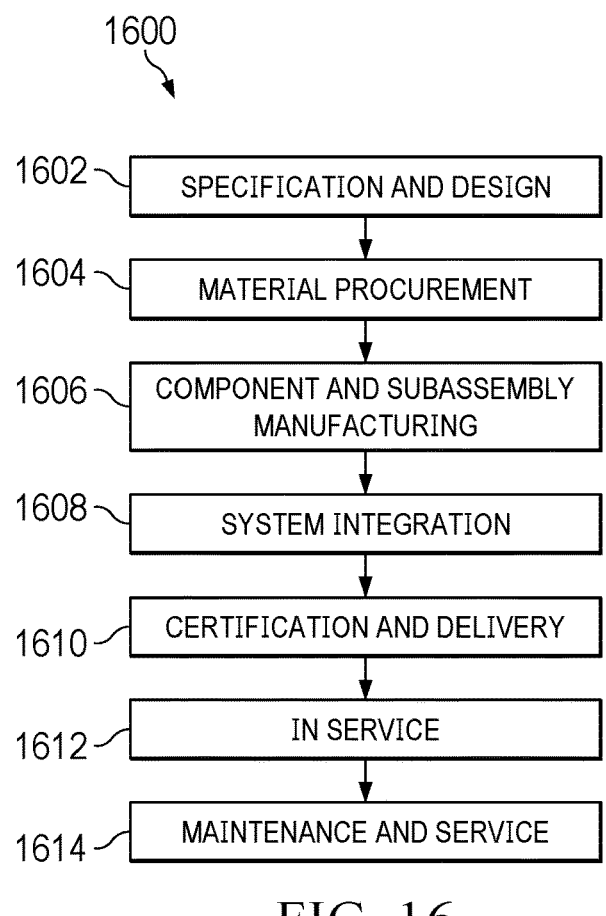
FIG. 16 is an illustration of an aircraft manufacturing and service method in a form of a block diagram in accordance with an illustrative embodiment.
Figure 17:
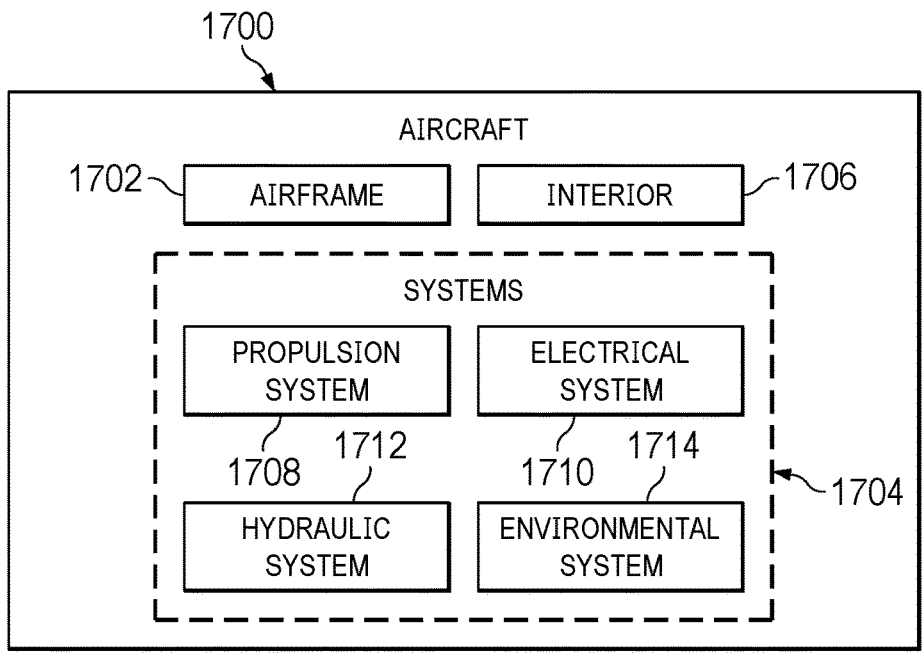
FIG. 17 is an illustration of an aircraft in a form of a block diagram in which an illustrative embodiment may be implemented.

Illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method in a form of a block diagram is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through certification and delivery 1610 in order to be placed in service 1612. While in service 1612 by a customer, aircraft 1700 is scheduled for routine maintenance and service 1617, which may include modification, reconfiguration, refurbishment, or other maintenance and service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft in a form of a block diagram is depicted in which an illustrative embodiment may be implemented. In this example, aircraft 1700 is produced by aircraft manufacturing and service method 1600 of FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included.

Apparatuses and methods embodied herein may be employed during at least one of the stages of aircraft manufacturing and service method 1600. One or more illustrative embodiments may be manufactured or used during at least one of component and subassembly manufacturing 1606, system integration 1608, in service 1612, or maintenance and service 1617 of FIG. 16.

The illustrative examples provide a method to vent trapped doubler plies in a composite preform. The illustrative examples make an aligned hole common to each doubler ply. The vent hole could be drilled, could be made during the layup process (omitting material), pre-punched in each ply, or created post layup using an ultrasonic hole cutter or a path created with displaced fibers into the doubler area.

In some illustrative examples, the vent hole can later be drilled to a larger diameter and used for assembly. In some illustrative examples, the vent hole is filled with resin after debaulk and during cure any resulting resin migration facilitates interlaminar toughness.

In some illustrative examples, a slightly undersized plug can be placed in the vent hole to prevent excess resin migration during debulk and removed during cure to allow resin migration. In some illustrative examples, the vent hole is in same location and smaller than the hole used for production requirements for fasteners and other features.

The vent hole(s) allow trapped gasses to be removed from the doubler plies. In some illustrative examples, a slightly undersized plug can be placed in the hole to prevent excess resin migration during cure.

In some illustrative examples, the method leverages the fact that the pad up exists due to a future penetration at that location. In these illustrative examples, an undersized hole can be created in the same location during or after the layup process. This vent hole, common to all the pad up plies, allows the entrapped air to be extracted through the Z-axis of the laminate. The hole does not need to be large. In some illustrative examples, a single vent hole as small as 0.25" can be used in the DVD process to vent pad ups. The holes can be cut using NC controlled cutters prior to layup, or material can be locally omitted during the layup process if AFP machines are being used. Optionally, ultrasonic hole punches can be used to create vent holes post layup.

In some illustrative examples, a PTFE or cork plug is placed in the hole to prevent excess resin loss at the vent hole location. In some illustrative examples, some modifications to the cure vacuum bagging is made to allow the gas extraction at the location of the vent hole. In some illustrative examples, this modification includes a few small perforations through the solid separator film over the vent location(s). Perforations will allow gas to pass through the separator film into breather material covering the part.

The illustrative examples provide methods for evacuating the air from trapped doublers plies in the acreage area of laminate that do not extend to the edge of the part. These localized doubler plies tend to trap air, and create porosity in cured parts, due to their edges being sealed by the continuous plies above and below them. The reason these trapped doubler plies are typically used is to locally reinforce a laminate where there will be an aperture placed (machined or drilled) in subsequent production operations. This invention uses under sized holes placed in the production hole locations prior to cure to allow gasses to escape from the trapped doubler plies when Double Vacuum Debulk (DVD) or Vacuum Bag Only (VBO) cure processes are used.

The benefit of the vent holes is that is allows the air to be extracted from the edge of the trapped doubler plies and then up through the thickness of the laminate. The extraction distance is greatly shortened by use of the vent or plurality of pins and eliminates the use of extended precure vacuum dwells. The illustrative examples allow for previously autoclave only pre-pregs to be processed using the DVD method even if the layup includes trapped doubler plies.

Some of the illustrative examples provide for a perforation or hole be placed in each ply common to the pad up location. These holes will be aligned during the layup process. In some illustrative examples, if the hole is larger than 0.25", a PTFE plug or dam, slightly smaller than the hole diameter, can be placed in the hole. A plug or dam will reduce resin loss. The solid separator film used in the cure vacuum bag can be perforated at the location of the vent hole. The perforated separator film will allow the air to escape the exposed ply edges inside hole, travel through the perforated separator film, and into the breather over the laminate. If the pad up plies do not continue through the full thickness of the laminate, the vent hole need not be full thickness.

The illustrative examples allow pre-pregs that previously could only be used with autoclave cures to be cured without using an autoclave. The elimination of autoclave processing for these pre-pregs will result in cost savings and a cost avoidance related to the acquisition and operation of auto-claves.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite structure, the method comprising:
    forming a preform having a number of vents and a plurality of plies, the plurality of plies including a plurality of sets of full length plies and a plurality of sets of partial plies, the number of vents extending through the plurality of sets of partial plies;
    positioning a plug into a vent of the number of vents in the preform prior to performing debulk; and
    performing debulk on the preform such that at least one of air, volatiles, or resin are drawn from the plurality of sets of partial plies through the number of vents and out of the preform.

2. The method of claim 1, wherein forming the preform having the number of vents comprises:
    forming the plurality of plies including the plurality of sets of full length plies and the plurality of sets of partial plies, the plurality of sets of partial plies comprising a number of vent holes; and
    laying up the plurality of plies on a tool to form the preform, including stacking the number of vent holes vertically to form the number of vents in the preform.

3. The method of claim 2, wherein laying up the plurality of plies comprises alternating sets of partial plies and sets of full length plies.

4. The method of claim 1, wherein forming the preform having the number of vents comprises:
    forming the plurality of plies including the plurality of sets of full length plies and the plurality of sets of partial plies;
    laying up the plurality of plies on a tool to form the preform; and
    cutting the number of vents into the preform through the plurality of sets of partial plies and at least one full length ply of the plurality of sets of full length plies using a cutting tool.

5. The method of claim 1, wherein forming the preform having the number of vents comprises:

forming the plurality of plies including the plurality of sets of full length plies and the plurality of sets of partial plies;
    laying up the plurality of plies on a tool to form the preform; and
    pressing a plurality of pins through the plurality of sets of partial plies to form the number of vents.

6. The method of claim 1, wherein the number of vents extend through an entirety of the preform.

7. The method of claim 1, wherein the number of vents extend partially through the preform.

8. The method of claim 1 further comprising:
    positioning a release film over the preform prior to performing the debulk, the release film comprising a number of perforations positioned over the number of vents.

9. The method of claim 1 further comprising:
    curing the preform to form a laminate; and
    cutting the number of vents out of the laminate.

10. The method of claim 1, wherein positioning a plug into a vent of the number of vents comprises placing the plug having a length substantially the same as a depth of the vent into the vent.

11. The method of claim 1, wherein the number of vents extending through the plurality of sets of partial plies comprises a number of holes extending in a through thickness direction of the preform, wherein at least one vent of the number of vents extends through each set of the plurality of sets of partial plies.

12. The method of claim 1, wherein the at least one of air, volatiles, or resin travel along a plurality of air paths formed by each set of partial plies of the plurality of sets of partial plies and through a vent of the number of vents to exit the preform during the debulk.

13. The method of claim 12, wherein the vent acts as a shared conduit through the preform for all sets of partial plies of the plurality of sets of partial plies.

14. The method of claim 1, wherein full length plies of the plurality of sets of full length plies extend out to edges of the preform, and wherein partial plies of the plurality of sets of partial plies do not extend to the edges.

15. The method of claim 1, wherein partial plies of the plurality of sets of partial plies are sealed by respective full length plies of the plurality of sets of full length plies positioned above and below the partial plies.

16. The method of claim 1, wherein the plug comprises a material configured to maintain its geometry during debulk and cure of the preform.

17. The method of claim 1 further comprising:
preventing creation of a resin starved area in the preform using the plug while performing the debulk.

18. The method of claim 1 further comprising:
preventing excess resin from leaving the preform using the plug while performing the debulk.

19. The method of claim 1 further comprising:
    positioning a release film, a breather, and a vacuum bag over the preform prior to performing the debulk.

20. The method of claim 1 further comprising:
    pressing a plurality of pins through the plurality of sets of partial plies to locally displace fibers of the plurality of sets of partial plies to form the number of vents.

21. The method of claim 1, wherein performing the debulk comprises performing a double vacuum debulk.

* * * * *